July 21, 1964 — J. P. SPICA — 3,141,617
WINDSHIELD WASHER NOZZLE
Filed April 23, 1962 — 2 Sheets-Sheet 1

INVENTOR.
JOSEPH P. SPICA
BY
HIS ATTORNEY

July 21, 1964 — J. P. SPICA — 3,141,617
WINDSHIELD WASHER NOZZLE
Filed April 23, 1962 — 2 Sheets-Sheet 2
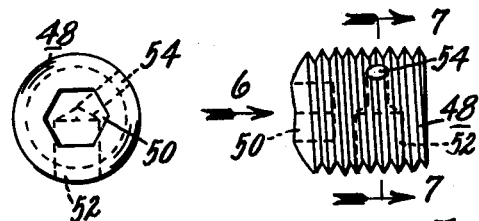
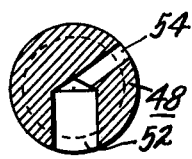
Fig. 6  Fig. 5  Fig. 7
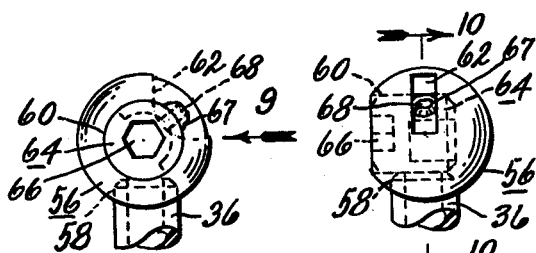
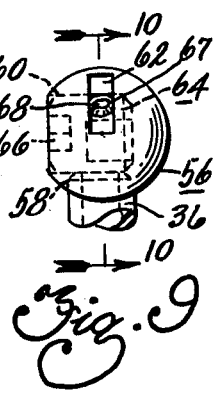
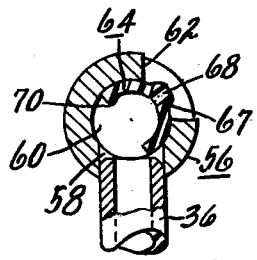
Fig. 8  Fig. 9  Fig. 10
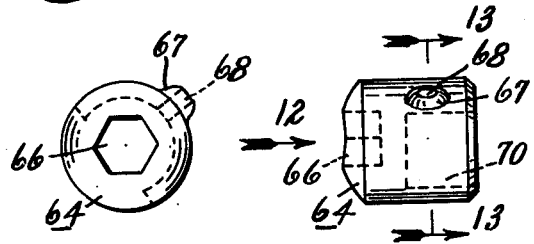
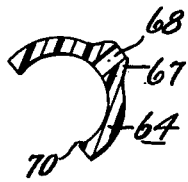
Fig. 12  Fig. 11  Fig. 13
INVENTOR.
JOSEPH P. SPICA
BY
HIS ATTORNEY 3,141,617
WINDSHIELD WASHER NOZZLE
Joseph P. Spica, Dearborn, Mich., assignor to General Motors Corporation, Detroit, Mich., a corporation of Delaware
Filed Apr. 23, 1962, Ser. No. 189,528
3 Claims. (Cl. 239—284)

This invention pertains to windshield cleaning apparatus, and particularly to improved angularly adjustable windshield washer nozzle assemblies.

Heretofore, the majority of angularly adjustable windshield washer nozzles included a nozzle member with an exposed spray orifice and having threaded engagement with a fitting so as to be capable of angular adjustment by means of the proper tool so that the liquid solvent ejected from the spray orifice, or orifices, would impinge a predesignated area on the windshield which is traversed by a wiper blade during its movement across the windshield. One of the recurrent problems associated with washer nozzles having exposed spray orifices is that of clogging the spray orifices when the exterior of the vehicle is cleaned and/or polished. The present invention relates to improved angularly adjustable windshield washer nozzle assemblies wherein the insert, or nozzle member having the spray orifice, is enclosed in a fitting having an elongate slot through which the liquid solvent can be discharged thereby reducing the likelihood of clogging the spray orifice.

Accordingly, among my objects are the provision of an improved angularly adjustable windshield washer nozzle assembly for vehicles; the further provision of a washer nozzle assembly including a fitting having an arcuate slot and an angularly adjustable nozzle element carried by the fitting and having a spray orifice for discharging liquid solvent through the slot of the fitting; and the still further provision of a washer nozzle assembly of the aforesaid type wherein the spray orifice of the insert is located a substantial distance inward of the outer periphery of the fitting.

The aforementioned and other objects are accomplished in the present invention by utilizing a substantially spherical fitting having intersecting bores and an elongate arcuate peripheral slot communicating with said intersecting bores. Specifically, two embodiments of the improved washer nozzle assemblies are disclosed herein. In one embodiment the spherical fitting has one of its intersecting bores threaded for receiving a threaded insert, or nozzle element, having a radial bore connecting with a spray orifice. The other bore of the fitting receives a tubular support member through which liquid solvent is supplied by a windshield washer pump. The radial bore in the insert communicates with the other of the intersecting bores in the fitting, and the insert has a tool receiving socket for adjusting the angular position thereof. Thus, the insert can be angularly adjusted so that the spray orifice therein communicates with any desired portion of the elongate arcuate slot in the fitting so as to direct the liquid solvent discharged therefrom onto a predesignated area of the windshield. The radial bore in the insert is of a diameter substantially equal to that of the tubular member through which the liquid solvent is supplied thereby enabling the liquid solvent to be circulated in the insert prior to ejection through the orifice therein.

In the second embodiment the spherical fitting likewise has intersecting bores, neither of which is threaded. The intersecting bores communicate with an elongate arcuate peripheral slot. In the second embodiment the insert is preferably composed of plastic and includes a protruding nozzle portion having a spray orifice therein which is piloted in the elongate arcuate slot of the fitting. The raised, or protruding, nozzle portion of the fitting retains the nozzle insert in assembled relation with the fitting, and the plastic insert is likewise formed with a tool receiving socket for adjusting the angular position thereof relative to the fitting.

Further objects and advantages of the present invention will be apparent from the following description, reference being had to the accompanying drawings, wherein preferred embodiments of the present invention are clearly shown.

In the drawings:

FIGURE 5 is an enlarged side elevational view of the nozzle insert of the first embodiment.

FIGURE 6 is an end view taken in the direction of the arrow 6 of FIGURE 5.

FIGURE 7 is a sectional view taken along line 7—7 of FIGURE 5.

FIGURE 8 is a fragmentary end view of a nozzle assembly constructed according to the second embodiment of this invention.

FIGURE 9 is a side view taken in the direction of arrow 9 of FIGURE 8.

FIGURE 10 is a sectional view taken along line 10—10 of FIGURE 9.

FIGURE 11 is an enlarged view of the nozzle insert of the second embodiment.

FIGURE 12 is an end view taken in the direction of arrow 12 of FIGURE 11.

FIGURE 13 is a sectional view taken along line 13—13 of FIGURE 11.

Figure 1:
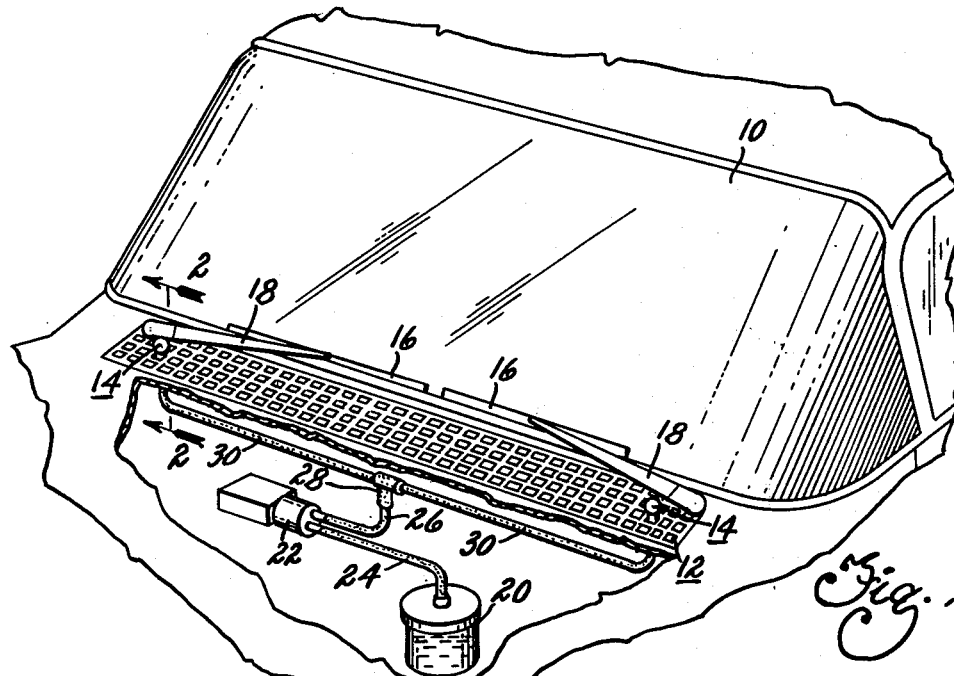
FIGURE 1 is a fragmentary view with certain parts broken away, partly in section and partly in elevation, of a vehicle equipped with the improved windshield washer nozzle assembly of this invention.

With reference to FIGURE 1, a vehicle is shown having a windshield 10 and a louvered cowl ventilator grille 12 which supports a pair of spaced washer nozzles, 14. The washer nozzles 14 are designed to spray liquid solvent onto predesignated areas of the windshield 10 into the paths of movement traversed by wiper blades 16 carried by wiper arms 18. The wiper arms 18, which may be of the conventional type including spring hinge connected inner and outer sections, are oscillated in phase opposition by a pair of pivot shafts, not shown, driven by a wiper motor, not shown. Washer solvent is drawn from a reservoir 20 by a pump 22 through a conduit 24 and delivered by the pump 22 under pressure to a conduit 26 having a T-fitting 28 connected to conduits 30 for delivering the liquid solvent to the spaced nozzle assemblies 14 through which the liquid solvent is discharged onto predesingated areas of the windshield 10.

Figure 2:
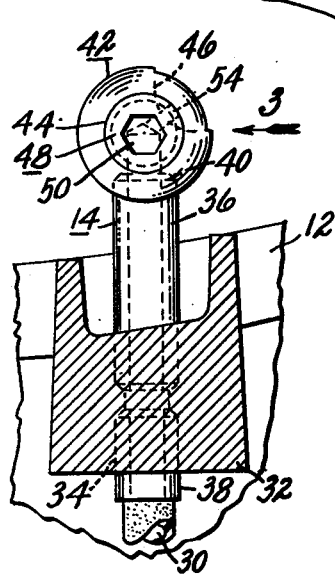
FIGURE 2 is a fragmentary sectional view taken along line 2—2 of FIGURE 1.
Figure 3:
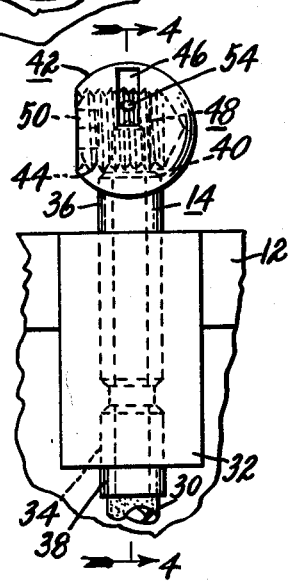
FIGURE 3 is an elevational view taken in the direction of arrow 3 of FIGURE 2.
Figure 4:
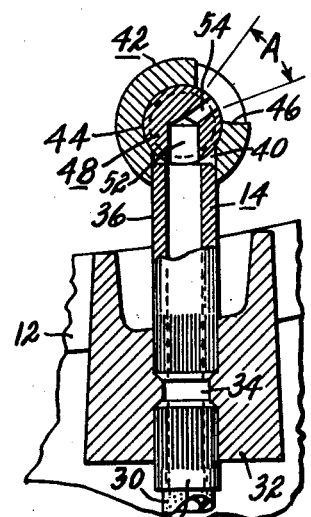
FIGURE 4 is a sectional view taken along line 4—4 of FIGURE 3.

With reference to FIGURES 2 through 4, in both embodiments of the improved washer nozzle assemblies disclosed herein the nozzle assemblies are supported by bosses 32 in the louvered cowl grille 12. Each boss 32 has a step diameter bore 34 therethrough into which upper and lower tubular members 36 and 38 are press fitted. The tubular member 38 connects with the flexible conduit 30. The upstanding tubular member 36 has its upper end press fitted in a bore 40 of a substantially spherical, ornamental fitting 42. The fitting 42 has a second threaded bore 44 intersecting the bore 40, and an elongate arcuate peripheral slot 46 connecting with the threaded bore 44. The elongate arcuate slot 46 extends a distance less than 90° around fitting 42 in a quadrant of the fitting which can be positioned toward windshield 10.

As seen more particularly in FIGURE 6, the threaded bore 44 receives an externally threaded metal insert, or nozzle element, 48 having a partially spherical end with a tool receiving socket 50 formed therein. As shown, the tool receiving socket is adapted to receive an Allen wrench. In addition, the insert 48 has a radial bore 52 connecting with a spray orifice, or jet, 54.

When the insert 48 is threaded into the bore 44 of the fitting 42 to a position where the spray orifice 54 is in alignment with the arcuate slot 46, the angular relation between the spray orifice and the fitting 42 can be adjusted throughout the range depicted by the angle A in FIGURE 4. Thus, the windshield area onto which liquid solvent is discharged by each nozzle assembly can be selected for the most effective windshield cleaning in conjunction with movement of the wiper blades 16 thereacross. It is to be noted that the spray orifice 54 in the insert 48 is located a substantial distance inward of the outer periphery of the fitting 42 thereby substantially reducing the likelihood of clogging of the spray orifice 54 due to cleaning or polishing of the vehicle. The elongate arcuate slot 46 is of sufficient size to permit ready cleaning of foreign material therefrom, and this can be accomplished without danger of clogging the spray orifice 54 by merely turning the insert 48 to an angular position wherein the spray orifice is blocked by an internal wall of the fitting. In addition, as seen in FIGURE 4, the bore 52 of the nozzle element 48 is of substantial size thus permitting liquid solvent to circulate within the nozzle element prior to ejection through the spray orifice 54.

With reference to FIGURES 8 through 13, in the second embodiment of the improved windshield washer nozzle assembly, a substantially spherical fitting 56 is likewise used, this fitting having a bore 58 into which the tubular member 36 is press fitted. The fitting 56 also has an intersecting bore 60 which is not threaded, and an elongate arcuate peripheral slot 62 connecting with the bore 60. Slot 62 extends less than 90° around fitting 56 and is positioned in a quadrant of fitting 56 which can also be positioned toward windshield 10. The fitting 56 is designed to receive a plastic nozzle element 64 having a tool receiving socket 66 in its exposed end, and protruding, or raised, nozzle portion 67 with a spray orifice 68 connecting with a cutout 70. The cutout 70 communicates with the bore 60, and the protruding, or raised, nozzle portion 67 is piloted in the elongate arcuate slot 62.

Since the nozzle element 64 is composed of plastic, and a substantial portion thereof is cut away in the area of the raised nozzle portion 67 it can be readily inserted into the fitting 56 by deformation thereof, and when the raised nozzle portion 67 is aligned with the slot 62 it will snap into position. In the second embodiment the nozzle element 64 can likewise be rotated to any position within the range of angle A as shown in FIGURE 4, but it cannot be rotated to a position where the spray orifice 68 is blocked due to the raised portion 67 thereof which is piloted in the slot 62.

While the embodiments of the invention as herein disclosed constitute preferred embodiments, it is to be understood that other forms might be adopted.

What is claimed is as follows:

1. A windshield washer nozzle assembly including, a stationary fitting having an elongate arcuate peripheral slot and a pair of intersecting bores, said elongate arcuate slot extending less than 90° around said fitting in a quadrant thereof adapted to be positioned toward a windshield to be cleaned, a tubular solvent supply member communicating with one of said intersecting bores, and a cylindrical insert disposed within the other of said intersecting bores, and supported for rotation relative to said fitting, said insert having a spray orifice communicating with said tubular solvent supply member and being adjustable throughout the range of said elongate arcuate slot for discharging liquid solvent solely through said spray orifice at any position thereof within the range of said elongate arcuate slot.

2. The windshield washer nozzle assembly set forth in claim 1 wherein one of the intersecting bores of said fitting is threaded, and wherein said insert has an externally threaded portion in engagement therewith.

3. The windshield washer nozzle assembly set forth in claim 1 wherein said insert comprises a plastic member having a raised nozzle portion piloted in said elongate arcuate slot of said fitting for limiting rotation of said insert relative to said fitting, said raised nozzle portion having the spray orifice therein.

References Cited in the file of this patent

UNITED STATES PATENTS

| | | |
|---|---|---|
| 2,622,929 | Neufeld | Dec. 23, 1952 |
| 2,703,258 | Neufeld | Mar. 1, 1955 |
| 2,898,036 | Newill | Aug. 4, 1959 |
| 3,008,649 | Bock et al. | Nov. 14, 1961 |

FOREIGN PATENTS

| | | |
|---|---|---|
| 464,162 | Canada | Apr. 4, 1950 |
| 810,270 | Great Britain | Mar. 11, 1959 |
| 1,057,895 | Germany | May 21, 1959 |